United States Patent
Sato

(10) Patent No.: US 6,459,542 B1
(45) Date of Patent: Oct. 1, 2002

(54) THIN FILM MAGNETIC HEAD HAVING THE COIL LAYER PATTERNED DIRECTLY ON AN INSULATING LAYER ON A LOWER CORE LAYER AND ITS MANUFACTURING METHOD

(75) Inventor: Kiyoshi Sato, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 58 days.

(21) Appl. No.: 09/604,482

(22) Filed: Jun. 27, 2000

(30) Foreign Application Priority Data

Jun. 28, 1999 (JP) .............................. 11-181232

(51) Int. Cl.⁷ .............................. G11B 5/23; G11B 5/17
(52) U.S. Cl. ...................... 360/126; 360/119; 360/123
(58) Field of Search ................ 360/317, 119, 360/123, 126

(56) References Cited

U.S. PATENT DOCUMENTS

| 5,452,164 | A | | 9/1995 | Cole et al. ................. 360/126 |
|---|---|---|---|---|
| 5,649,351 | A | | 7/1997 | Cole et al. ................. 29/603.14 |
| 5,652,687 | A | | 7/1997 | Chen et al. .................. 360/126 |
| 5,802,700 | A | | 9/1998 | Chen et al. ............... 29/603.14 |
| 6,252,748 | B1 | * | 6/2001 | Yamanaka et al. .......... 360/317 |
| 6,278,580 | B1 | * | 8/2001 | Sasaki ......................... 360/126 |
| 6,282,056 | B1 | * | 8/2001 | Feng et al. .................. 360/126 |
| 6,289,578 | B1 | * | 9/2001 | Kamijima ................ 29/603.14 |
| 6,317,289 | B1 | * | 11/2001 | Sasaki ......................... 360/126 |
| 6,320,726 | B1 | * | 11/2001 | Sasaki ......................... 360/126 |
| 6,329,211 | B1 | * | 12/2001 | Terunuma et al. ............. 438/3 |

* cited by examiner

Primary Examiner—Jefferson Evans
(74) Attorney, Agent, or Firm—Brinks Hofer Gilson & Lione

(57) ABSTRACT

A coil layer is patterned directly on an insulation layer formed on a lower core layer. This can decrease the height dimension from the top of a top pole layer to the top of a coil insulation layer as compared with a conventional example, thereby permitting precise patterning of an upper core layer.

5 Claims, 4 Drawing Sheets

THIN FILM MAGNETIC HEAD HAVING THE COIL LAYER PATTERNED DIRECTLY ON AN INSULATING LAYER ON A LOWER CORE LAYER AND ITS MANUFACTURING METHOD

BACKGROUND OF THE INVENTION

1. Field of the Invention

The present invention relates to a thin film magnetic recording head used as, for example, a floating magnetic head and the like, and particularly to a thin film magnetic head in which an upper core layer can precisely be patterned, and a magnetic path formed by lower and upper core layers can be shortened, and a method of manufacturing the thin film magnetic head.

2. Description of the Related Art

FIG. 9 is a partial sectional view showing the structure of a conventional thin film magnetic head (inductive head), and FIG. 10 is a partial sectional view of the thin film magnetic head taken along line X—X line in FIG. 9, as viewed from direction A.

In FIGS. 9 and 10, reference numeral 1 denotes a lower core layer made of a magnetic material such as permalloy or the like, and an insulation layer 3 is formed on the lower core layer 1.

The insulation layer 3 has a trench 3a which is formed in the depth direction from the surface (referred to as "ABS" hereinafter) facing a recording medium to have an inner width dimension equal to a track width Tw.

The trench 3a contains a bottom pole layer 4 magnetically connected to the lower core layer 1, a gap layer 5, and a top pole layer 7 magnetically connected to an upper core layer 6, which are formed by plating in turn from the bottom.

As shown in FIG. 10, the top pole layer 7 formed on the gap layer 5 is formed with a predetermined length dimension Gd from the ABS in the depth direction (the Y direction shown in the drawings), and a Gd setting insulation layer 8 is formed to extend in the depth direction from a portion of the top of the gap layer 5 which is located at the back of the cop pole layer 7 to a portion of the top of the insulation layer 3 which is located at the back of the trench 3a of the insulation layer 3. The Gd setting insulation layer 8 is made of, for example, a resist material. The length dimension Gd of the top pole layer 7 corresponds to the gap depth which has a great effect on the electric properties of the thin film magnetic head, and is thus set to a predetermined length dimension by forming the Gd setting insulation layer 8.

As shown in FIG. 10, a coil layer 9 is formed in a spiral pattern on the insulation layer 3 with the Gd setting insulation layer 8 provided therebetween. The coil layer 9 is made of a conductive material having low electric resistance, for example, such as Cu or the like.

The coil layer 9 is covered with a coil insulation layer 11 made of an organic material or the like, and the upper core layer 6 is formed by plating a magnetic material such as permalloy or the like to extend from the top pole layer 7 to the coil insulation layer 11. As shown in FIG. 9, the width dimension T1 of the upper core layer 6 exposed in the ABS is larger than the track width Tw, and the upper core layer 6 is magnetically connected to the top pole layer 7 formed in the trench 3a of the insulation layer 3.

In the write inductive head, when a recording current is supplied to the coil layer 9, a recording magnetic field is induced in each of the lower core layer 1 and the upper core layer 6 so that magnetic signals are recorded on the recording medium such as a hard disk or the like by a leakage magnetic field between the bottom pole layer 4 and the top pole layer 7 magnetically connected to the lower core layer 1 and the upper core layer 6, respectively.

In the inductive head shown in FIG. 9, the insulation layer 3 is formed on the lower core layer 1 and has the trench 3a which is formed with a predetermined length L1 from the ABS in the depth direction (the Y direction shown in FIG. 9). The trench 3a can be formed by, for example, anistropic etching, to have a width dimension in submicron unit.

In the inductive head shown in FIG. 9, the inner width dimension of the trench 3a is defined as the track width Tw so that the bottom pole layer 4 and the top pole layer 7 magnetically connected to the lower core layer 1 and the upper core layer 6, respectively, are formed with the gap layer 5 provided therebetween within the track width Tw. Therefore, a leakage magnetic field produced between the bottom pole layer 4 and the top pole layer 7 can be produced in the narrow track width Tw, thereby making the inductive head adaptable for track narrowing accompanying with increases in recording density in future.

However, in the structure of the thin film magnetic head shown in FIGS. 9 and 10, the coil layer 9 is formed on the C;d setting insulation layer B formed on the insulation layer 3, and thus the height dimension H1 from the top of the top pole layer 7 to the top of the coil insulation layer 11, which covers the coil layer 9, is very large.

With a large height dimension H1, there is a problem in that the upper core layer 6 cannot be precisely patterned to extend from the top pole layer 7 to the coil insulation layer 11.

The upper core layer 6 is formed by a so-called frame plating process which comprises coating a resist layer in a region ranging from the top pole layer 7 to the coil insulation layer 11 shown in FIG. 10, and then patterning the resist layer in the shape of the upper core layer 6 by exposure and development.

However, with the large height H1 from the top of the top pole layer 7 to the top of the top of the coil insulation layer 11, the resist layer formed on the top pole layer 7 has a large thickness, thereby increasing the focal depth in exposure and development. Therefore, the wavelength of an exposure light source is shortened to increase the focal depth. In this case, resolution (resolving power) deteriorates, and particularly, the tip portion 6a of the upper core layer 6 cannot be formed in a predetermined shape on the top pole layer 7.

Furthermore, since the thickness of the resist layer formed on the top pole layer 7 greatly differs from the thickness of the resist layer formed on the coil insulation layer 11, irregular reflection occurs due to a difference in focus in exposure and development, and thus the upper core layer 6 cannot be precisely patterned in the resist layer.

In the thin film magnetic head shown in FIG. 10, the Gd setting insulation layer 8 formed below the coil layer 9 is formed by spin-coating a resist material or the like on the insulation layer 3.

However, since the Gd setting insulation layer 8 is formed by spin coating, waviness occurs on the surface, and thus formation of the coil layer 9 on such a waviness surface causes a problem in that the coil layer 9 cannot be patterned in an appropriate shape due to a focal disturbance in exposure and development of the resist layer used for forming the coil layer 9.

Therefore, the pitch T2 of the coil layer 9 is increased to permit appropriate patterning of the coil layer 9 to some extent. However, in this case, an increase in the pitch T2 of the coil layer 9 enlarges the entire size of the coil layer 9, and thus the length dimension from the chip portion 6a to the base end 6b of the upper core layer 6 must be increased to lengthen the magnetic path formed by the upper core layer 6 and the lower core layer 1, thereby causing the problem of increasing inductance.

Also, when the height dimension H1 from the top of the top pole layer 7 to the top of the coil insulation layer 11 is increased, the upper core layer 6 must be formed with a long length. Therefore, in the thin film magnetic head shown in FIG. 10, the magnetic path is further lengthened to readily increase inductance.

SUMMARY OF THE INVENTION

The present invention has been achieved for solving the above conventional problems, and an object of the present invention is to provide a thin film magnetic head in which an upper core layer can be precisely patterned, and the length of a magnetic path can be shortened to prevent an increase in inductance, and a method of manufacturing the thin film magnetic head.

A thin film magnetic head of the present invention comprises a lower core layer made of a magnetic material, an upper core layer made of a magnetic material, and an insulation layer located between the lower and upper core layers and having a trench which determines the gap width, all of which appear on the surface facing a recording medium, wherein the upper and lower core layers are laminated with a gap layer provided therebetween in the trench, and a coil layer is formed directly on a portion of the insulation layer, which is located at the hack of the trench in the height direction, for inducing a recording magnetic field in each of the upper and lower core layers.

Conventionally, a Gd setting insulation layer is formed between a coil layer and an insulation layer formed on a lower core layer, for defining the gap depth. However, in the present invention, the coil layer is formed directly on the insulation layer, and thus the height dimension from the position (for example, the top of the top pole layer 24 shown in FIG. 2) where the tip portion of the upper core layer is formed to the top of a coil insulation layer formed on the coil layer can be decreased, as compared with conventional heads. Therefore, the upper core layer can be precisely patterned to extend from the position where the tip of the upper core layer is formed to the coil insulation layer.

In addition to the advantage that the height dimension from the position where the tip portion of the upper core layer is formed to the top of the coil insulation layer formed on the coil layer can be decreased, the coil layer is patterned directly on the flat surface of the insulation layer to decrease the pitch of the coil layer, thereby decreasing the length dimension from the tip of the upper core layer to the base end thereof, as compared with a conventional head.

Therefore, in the present invention, the length of a magnetic path formed by the lower core layer and the upper core layer can be shortened to permit a reduction in inductance.

In the present invention, the Gd setting insulation layer may be provided on the insulation layer to extend in the depth direction from a back portion of the trench to a portion of the insulation layer surface where the trench is not formed, and the coil layer is not formed, and the upper core layer may be formed on the Gd setting insulation layer from the surface facing the recording medium so that the gap depth is determined by the facing-surface-side front end of the Gd setting insulation layer.

Namely, in the present invention, the Gd setting insulation layer and the coil layer are formed at the same level (on the surface of the insulation layer), and thus even with the Gd setting insulation layer formed, the height position of the top of the coil insulation layer from the position where the tip of the upper core layer is formed is not raised, thereby permitting precise patterning of the upper core layer.

In the present invention, a bottom pole layer magnetically connected to the lower core layer, a gap layer, and a top pole layer magnetically connected to the upper core layer are preferably formed by plating in turn from the bottom in the trench formed in the insulation layer.

In this case, the Gd setting insulation layer may be provided on the insulation layer to extend in the depth direction from a back portion of the top pole layer to a portion of the insulation layer surface where the trench is not formed, and the coil layer is not formed, and the upper core layer may be formed on the top pole layer and the Gd setting insulation layer from the surface facing the recording medium so that the gap depth is determined by the dimension from the surface facing the recording medium to the boundary between the top pole layer and the Gd setting insulation layer.

The present invention also provides a method of manufacturing a thin film magnetic head comprising a lower core layer made of a magnetic material, an upper core layer made of a magnetic material and opposed to the lower core layer with a nonmagnetic gap layer provided therebetween on the surface facing a recording in medium, and a coil layer for inducing a recording magnetic field in each of the lower and upper core layers; the method comprising the step of forming an insulation layer on the lower core layer and forming a trench in the insulation layer in the height direction from the surface facing the recording medium, for defining a track width; the step of forming a bottom pole layer magnetically connected to the lower core layer, the gap layer, and a top pole layer magnetically connected to the upper core layer in the trench by plating in turn from the bottom; the step of patterning the coil layer directly on a portion of the insulation layer, which is located at the back of the trench in the depth direction; the step of forming a coil insulation layer on the coil layer; and the step of forming the upper core layer on the tope pole layer and the coil insulation layer.

The surface of the insulation layer formed on the lower core layer is planarized, and the coil layer is patterned directly on the flat surface so that the coil layer can be readily and securely patterned with a narrow pitch.

In the present invention, since the coil layer is patterned directly on the insulation layer, the height dimension from the surface of the top pole layer (the surface where the tip of the upper core layer is formed) formed in the trench of the insulation layer to the top of the coil insulation layer formed on the coil layer can be decreased, as compared with a conventional head.

Therefore, in the present invention, the upper core layer can be precisely patterned on the top pole layer and the coil insulation layer by frame plating.

Also, in the present invention, the Gd setting insulation layer may be formed to extend in the depth direction from a back portion of the trench to a portion of the insulation layer surface where the trench is not formed, and the coil layer is not formed, the tope pole layer may be formed between the surface facing the recording medium and the Gd setting insulation layer in the trench, and the upper core layer may be formed on the top pole layer and the Gd setting insulation layer so that the gap depth is determined by the dimension from the surface facing the recording medium to the boundary between the top pole layer and the Gd setting insulation layer.

DESCRIPTION OF THE PREFERRED EMBODIMENT

Figure 1:
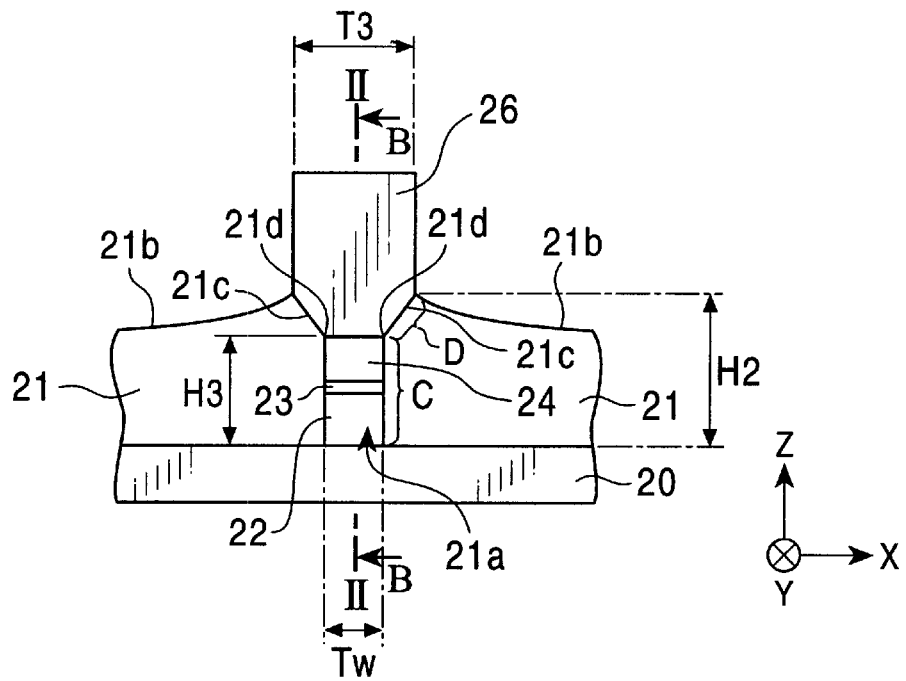
FIG. 1 is a partial front view showing the structure of a thin film magnetic head of the present invention.
Figure 2:
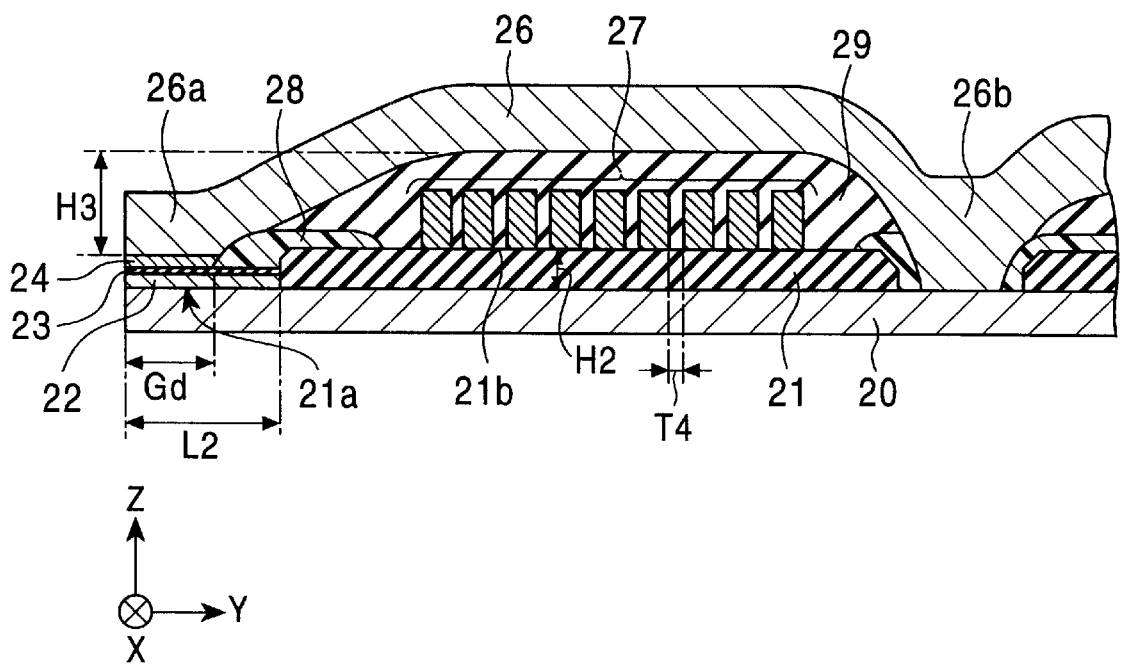
FIG. 2 is a partial sectional view of the thin film magnetic head taken along line II—II in FIG. 1.

FIG. 1 is a partial front view showing the structure of a thin film magnetic head of the present invention, and FIG. 2 is a partial sectional view of the thin film magnetic head taken along line II—II in FIG. 1, as viewed from direction B.

Although the thin film magnetic head shown in FIG. 1 is a recording inductive head, in the present invention, a reproducing head (MR head) using a magnetoresistive effect may be laminated on the inductive head.

In FIGS. 1 and 2, reference numeral 20 denotes a lower core layer made of a magnetic material, for example, such as permalloy or the like. Where the reproducing head is provided below the lower core layer 20, the lower core layer 20 also functions as an upper shield layer of the reproducing head.

As shown in FIGS. 1 and 2, an insulation layer 21 made of an insulating material is formed on the lower core layer 20. The insulating material comprises at least one of AlO, $Al_2O_3$, $SiO_2$, $Ta_2O_5$, TiO, AlN, AlSiN, TiN, SiN, $Si_3N_4$, NiO, WO, $WO_3$, BN, CrN, and SiON, and the insulation layer 21 comprises a single layer or a plurality of layers.

As shown in FIGS. 1 and 2, the maximum thickness dimension of the insulation layer 21 is H2, and particularly, the thickness dimension H2 is preferably about 1.0 to 4.0 $\mu$m.

In the present invention, the insulation layer 21 has a trench 21a formed to reach from the surface 21b of the insulation layer 21 to the top of the lower core layer 20 and have a predetermined length dimension L2 from the surface (referred to as "ABS" hereinafter) facing the recording medium in the depth direction (the Y direction shown in the drawings).

Furthermore, as shown in FIG. 1, the trench 21a comprises a track-width region C formed to a predetermined height H3 from the top of the lower core layer 20 with a track width Tw, and an inclined region D having inclined surfaces 21c which are formed to gradually increase the width dimension of the trench 21a from both side ends 21d of the track-width region C to the surface 21b of the insulation layer 21. The trench 21a is formed by, for example, anisotropic etching.

Figure 9:
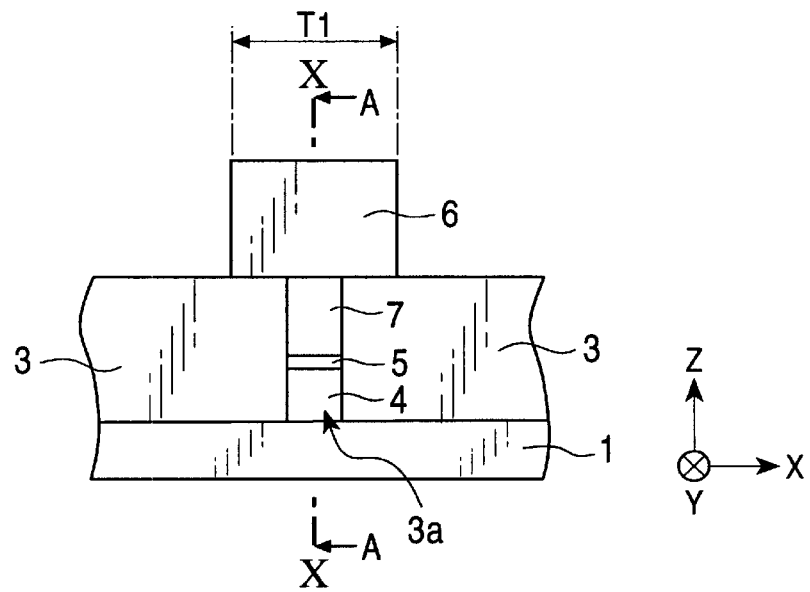
FIG. 9 is a partial front view showing the structure of a conventional thin film magnetic head.
Figure 10:
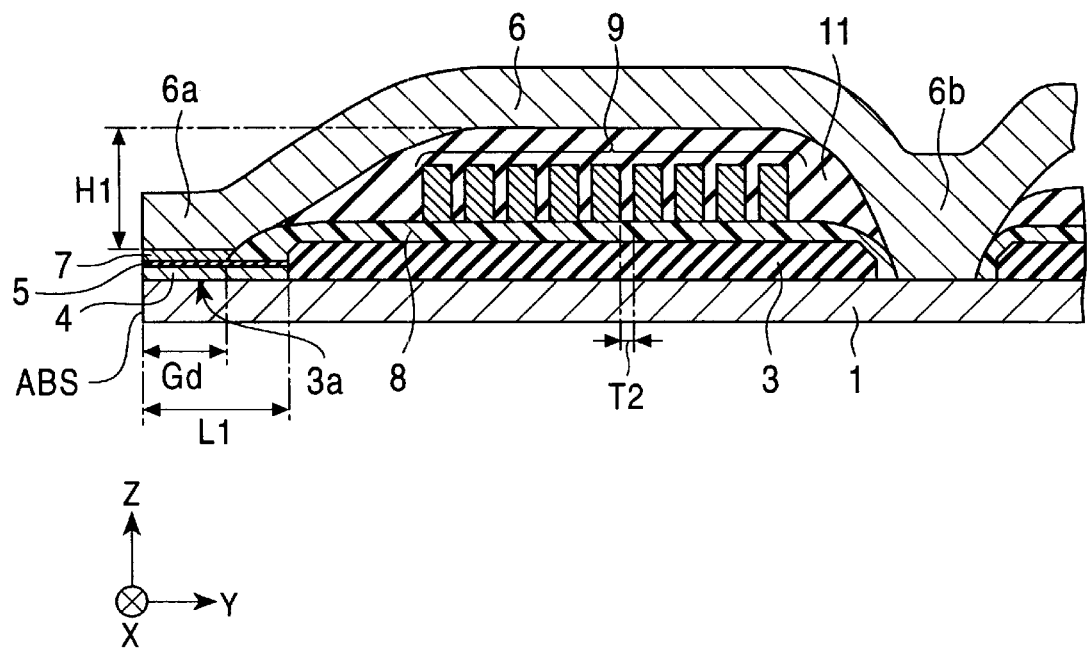
FIG. 10 is a partial sectional view of the thin film magnetic head taken along line X—X in FIG. 9.

In the present invention, like in the structure of the conventional thin film magnetic head shown in FIGS. 9 and 10, the trench 21a may comprise only the track-width region C, without the inclined region D formed. However, by forming the inclined region D in the trench 21a, the occurrence of write fringing can be appropriately suppressed.

Although, as described above, the thickness dimension H2 of the insulation layer is about 1.0 to 4.0 $\mu$m, the large thickness dimension H2 causes a problem in that the trench 21a cannot be formed with the track width Tw smaller than conventional values due to the problem of patterning precision.

In the present invention, the width dimension (i.e., the track width Tw) of the track-width region C of the trench 21a is 1.0 $\mu$m or less, and preferably 0.7 $\mu$m or less.

In the embodiment shown in FIG. 1, a bottom pole layer 22 is formed as an undermost layer in the track-width region C to be magnetically connected to the lower core layer 20.

The bottom pole layer 22 is made of a magnetic material such as permalloy or the like, which may be the same as or different from the material of the lower core layer 20. The bottom pole layer 22 is formed in the trench 21a by electroplating. The bottom pole layer 22 can be formed in a rectangular shape with a uniform thickness in the trench 21a by plating, with causing less distortion in the film plane (surface).

As shown in FIGS. 1 and 2, a gap layer 23 is formed on the bottom pole layer 22 in the trench 21a.

In the present invention, the gap layer 23 is made of a nonmagnetic metal material, and preferably formed in the trench 21a by electroplating. The gap layer 23 can be formed with a uniform thickness on the bottom pole layer 22 in the trench 21a by plating, with causing less distortion on the surface of the gap layer.

In the present invention, as the nonmagnetic metal material, at least one material is preferably selected from NiP, NiPd, NiW, NiMo, NiRh, Au, Pt, Rh, Pd, Ru, and Cr, and the gap layer 23 may comprise a single layer film or a multilayer film.

As shown in FIGS. 1 and 2, a top pole layer 24 is formed on the gap layer 23 in the trench 21a. The top pole layer 24 is magnetically connected to an upper core layer 26, which will be described below, and like the above-described bottom pole layer 22, the top pole layer 24 is formed by plating a magnetic material such as permalloy or the like. The material of the top pole layer 24 may be the same as or different from the upper core layer 26.

Although, in FIG. 1, the bottom pole layer 22, the gap layer 23 and the top pole layer 24 are continuously formed in the track-width region C by plating, the film structure deposited in the track-width region C is not limited to this structure. However, the top pole layer 24 magnetically connected to the upper core layer 26, or the upper core layer 26 without the top pole layer 24 formed must be formed at least in the track-width region C.

The upper core layer 26 has a larger width dimension T3 than the track width Tw, and is formed in the Z direction shown in the drawings from the boundaries between the inclined surfaces 21c of the trench 21a and the surface 21b of the insulation layer 21.

The upper core layer 26 is magnetically connected to the top pole layer 24 formed in the trench 21a, and the material of the upper core layer 26 may be the same as or different from the top pole layer 24.

Since the upper core layer 26 is formed with the larger width dimension T3 than the track width Tw, magnetic flux saturation can be suppressed. Also, the upper core layer 26 is formed on the inclined surfaces 21c formed in the trench 21a, whereby appropriately suppressing the occurrence of write fringing.

In the present invention, as shown in FIG. 1, the insulation layer 21 is formed on the lower core layer 20 to have a thickness H2 in the vicinity of the boundary between each of the inclined surfaces 21c of the trench 21a and the surface 21b of the insulation layer 21 so that the thickness gradually decreases from the boundary in the direction away from the trench 21a. As seen from FIG. 1, the surface 21b of the insulation layer 21 is curved.

However, the surface 21b of the insulation layer 21 is curved only on both sides of the trench 21a, while a portion of the surface 21b of the insulation layer 21, which extends in the depth direction (the Y direction shown in the drawing) from the trench 21a, is planarized.

In the present invention, the shape of the insulation layer 21 is not limited, and for example, like in the insulation layer 3 of the conventional thin film magnetic head shown in FIG. 10, the insulation layer 21 may be formed with the same thickness at any position.

In the present invention, as shown in FIG. 2, a coil layer 27 is patterned directly on the insulation layer 21 at the back of the trench 21a formed in the insulation layer 21 in the depth direction (the Y direction).

In the embodiment shown in FIG. 2, a Gd setting insulation layer 28 is provided on the insulation layer 21 so as to extend in the depth direction from the back side of the trench 21a to a region of the surface 12b of the insulation layer 21 where the trench 21 is not formed, and the coil layer 27 is not formed. The Gd setting insulation layer may be formed to extend from the gap layer 23 formed in the trench 21a to portions of the surface 21b of the insulation layer 21, which are located on both sides of the trench 21a. The Gd setting insulation layer 28 is made of, for example, a resist material.

The gap depth Gd is determined by the facing-surface (the ABS)-side front end of the Gd setting insulation layer 28.

In the embodiment shown in FIG. 2, the top pole layer 24 is formed on the gap layer 23 in front of the Gd setting insulation layer 28 so that the gap depth Gd is determined by the dimension from the ABS to the boundary between the top pole layer 24 and the Gd setting insulation layer 28. The gap depth Gd is set to the predetermined length because it greatly influences the electric characteristics of the thin film magnetic head.

Although the embodiment shown in FIG. 2 uses the Gd setting insulation layer 28 for defining the gap depth Gd, the Gd setting insulation layer 28 need not be used when the length dimension L2 from the ABS of the trench 21a formed in the insulation layer 21 in the depth direction is defined as the gap depth Gd, thereby simplifying the manufacturing process.

As shown in FIG. 2, a coil insulation layer 29 is formed on the coil layer 27 to cover the coil layer 27. The coil insulation layer 29 is made of an organic material such as polyimide, a resist material, or the like.

As shown in FIG. 2, the upper core layer 26 is formed on the top pole layer 24, the Gd setting insulation layer 28 and the coil insulation layer 29 by frame plating.

As shown in FIG. 2, the base end 26b of the upper core layer 26 is magnetically connected to the lower core layer 20.

In the thin film magnetic head, when a recording current is supplied to the coil layer 27, a recording magnetic field is induced in each of the upper core layer 26 and the lower core layer 20 to produce a leakage magnetic field between the top pole layer 24 magnetically connected to the upper core layer 26 and the bottom pole layer 22 magnetically connected to the lower core layer 20 through the gap layer 23 so that a magnetic signal is recorded on the recording medium such as a hard disk or the like by the leakage magnetic field.

In comparison between the structure of the thin film magnetic head of the present invention shown in FIGS. 1 and 2 and the structure of the conventional thin film magnetic head Shown in FIGS. 9 and 10, the coil layer 27 of the present invention is patterned directly on the insulation layer 21, while the coil layer 9 of the conventional magnetic head is formed on the insulation layer 3 with the Gd setting insulation layer 8 provided therebetween.

In the present invention, as shown in FIG. 2, the Gd setting insulation layer 28 is formed to extend in the depth direction from the gap layer 23 formed in the trench 21a to a portion of the insulation layer 21 at the back of the trench 21a, where the coil layer 27 is not formed, so that the Gd setting insulation layer 28 is not formed below the coil layer 27.

Therefore, in the present invention, as shown in FIG. 2, the height dimension H3 from the top of the top pole layer 24 (the position where the tip 26a of the upper core layer 26 is formed) to the top of the coil insulation layer 29 is smaller than the height dimension H1 shown in FIG. 10 by an amount corresponding to the thickness of the Gd setting insulation layer 28.

Since the height dimension H3 from the top of the top pole layer 24 to the top of the coil insulation layer 29 can be decreased, as described above, the upper core layer 26 can precisely be patterned in the predetermined shape extending from the top pole layer 24 to the coil insulation layer 29.

In the present invention, furthermore, the coil layer 27 is formed directly on the insulation layer 21. However, since the surface of the insulation layer 21 is planarized, even with the small pitch T4, the coil layer 27 can be patterned with high precision, and the whole size of the coil layer 27 can be decreased.

Although, as shown in FIG. 10, the coil layer 9 is conventionally formed on the Gd setting insulation layer 8, waviness readily occurs on the surface of the Gd setting insulation layer 8, and thus the pitch T2 of the coil layer 9 must be increased for precisely pattering the coil layer 9, thereby causing the tendency to increase the whole size of the coil layer 9.

On the other hand, in the present invention, the pitch T4 of the coil layer 27 can be decreased, and thus the whole size of the coil layer 27 can be decreased, thereby decreasing the length dimension from the tip 26a to the base end 26b of the upper core layer 26.

As described above, in the present invention, since the length dimension of the upper core layer 26 can be reduced, and thus the magnetic path formed by the upper core layer 26 and the lower core layer 20 can be shortened, thereby decreasing inductance.

Also, as described above, the height dimension H3 from the top of the top pole layer 24 to the top of the coil insulation layer 29 can be decreased as compared with the conventional head, and thus the length dimension of the upper core layer 26 can be further decreased to further shorten the length of the magnetic path.

As described above, in the thin film magnetic head of the present invention, the coil layer 27 is formed directly on the insulation layer 21 to permit precise patterning of the upper core layer 26 in the predetermined shape. In addition, the coil layer 27 can be formed with a narrow pitch, and thus the magnetic path formed by the upper core layer 26 and the lower core layer 20 can be shortened, thereby decreasing inductance.

FIGS. 3 to 8 are drawings showing the steps of the manufacturing method of the present invention. Also FIGS. 3 to 8 are partial sectional views showing the thin film magnetic head taken along the depth direction from the ABS.

Figure 3:
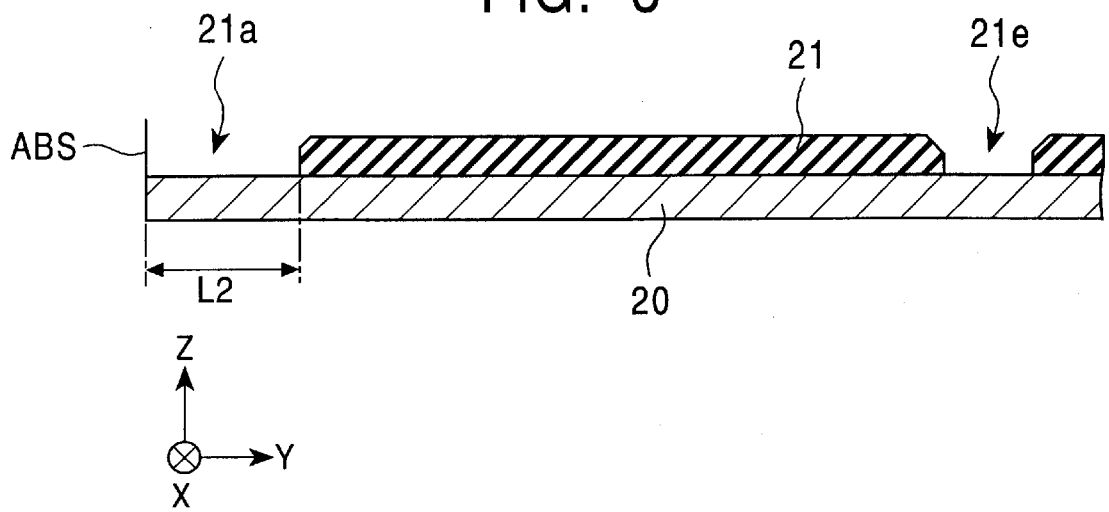
FIG. 3 is a drawing showing a step of a manufacturing method of the present invention.

In FIG. 3, the insulation layer 21 is first formed on the lower core layer 20 made of a magnetic material such as permalloy or the like. The insulation layer 21 is made of, for example, at least one insulating material of AlO, $Al_2O_3$, $SiO_2$, $Ta_2O_5$, TiO, AlN, AlSiN, TiN, SiN, $Si_3N_4$, NiO, WO, $WO_3$, BN, CrN, and SiON, and the insulation layer 21 comprises a single layer or a plurality of layers.

The trench 21a is formed in the insulation layer 21 to have the length dimension L2 from the ABS in the depth direction (the Y direction shown in the drawings). For example, as shown in FIG. 1, the trench 21a comprises the track-width region C formed with the inner width dimension equal, to the track width Tw, and the inclined region D having the inclined surfaces 21c which are formed so that the width dimension gradually increases from both side edges 21d of the track width region C to the surface 21b of the insulation layer 21.

However, in the present invention, the trench 21a may comprise only the track-width region C without the inclined region D formed, or the inclined region D may be formed in a late step.

As shown in FIG. 3, a hole 21e is formed in a back portion of the insulation layer at a predetermined distance from the ABS in the depth direction.

Figure 4:
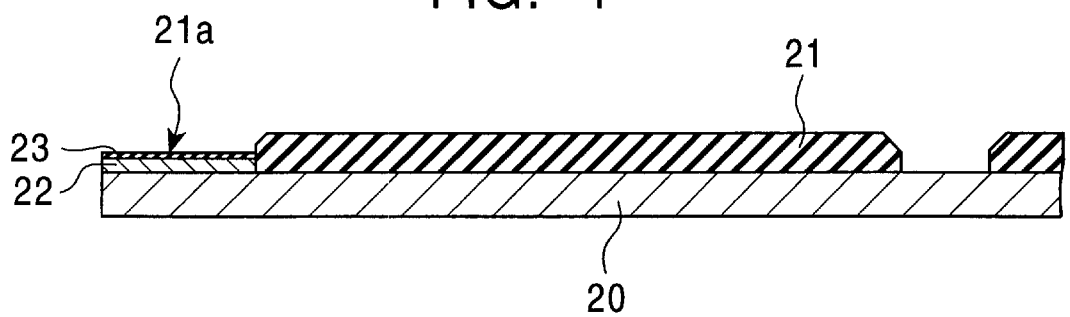
FIG. 4 is a drawing showing a step next to the step shown in FIG. 3.

In the next step shown in FIG. 4, the bottom pole layer 22 made of a magnetic material is formed by plating in the trench 21a formed in the insulation layer 21 to be magnetically connected to the lower core layer 20. Then, the gap layer 23 is further formed by plating on the bottom pole layer 22 in the trench 21a.

The gap layer 23 is made of a nonmagnetic metal material, and as the nonmagnetic metal material, at least one material is preferably selected from NiP, NiPd, NiW, NiMo, NiRh, Au, Pt, Rh, Pd, Ru, and Cr. The gap layer 23 may comprise a single layer film or a multilayer film.

Figure 5:
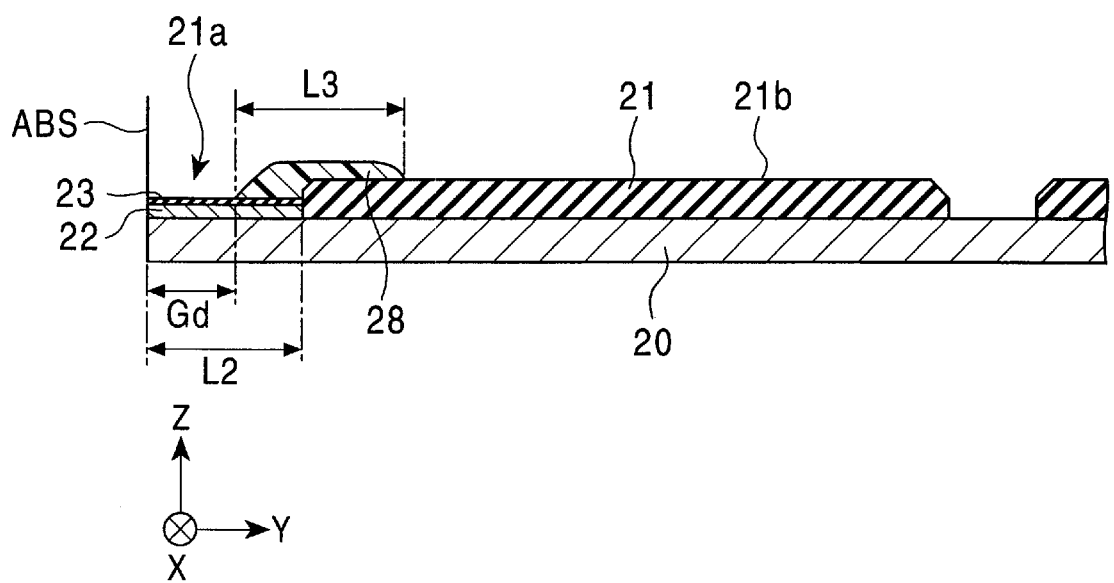
FIG. 5 is a drawing showing a step next to the step shown in FIG. 4.

In the next step shown in FIG. 5, the Gd setting insulation layer 28 is formed to extend in the depth direction from the back side of the trench 21a to the region of the surface 21b of the insulation layer 21 where the trench 21a is not formed, and the coil layer 27 is not formed.

The Gd setting insulation layer 28 is made of, for example, a resist material. With the Gd setting insulation layer 28 made of a resist material, the Gd setting insulation layer 28 is hardened by hard curing (heat treatment).

The Gd setting insulation layer 28 is provided for setting the distance Gd from the ABS in the depth direction (the Y direction shown in the drawing) to the predetermined value. The distance Gd is referred to as "the gap depth" which is an important dimension for attaining proper electric characteristics of the thin film magnetic head.

However, where the length dimension L2 of the trench 21a formed in the insulation layer 21 is previously set as the gap depth Gd, the Gd setting insulation layer 28 need not be formed. Therefore, by setting the trench 21a as the gap depth Gd, the manufacturing process can be simplified.

As shown in FIG. 5, the length dimension of the Gd setting insulation layer 28 formed to extend from the gap layer 23 to the insulation layer 21 is set to L3.

In the present invention, the Gd setting insulation layer 28 is formed with the predetermined length dimension L3, not over the entire portion of the insulation layer 21 at the back of the trench 21a in the depth direction, so that the, surface 21b of the insulation layer 21 is exposed at the back of the Gd setting insulation layer 28 (in the depth direction: the Y direction shown in the drawing).

Figure 6:
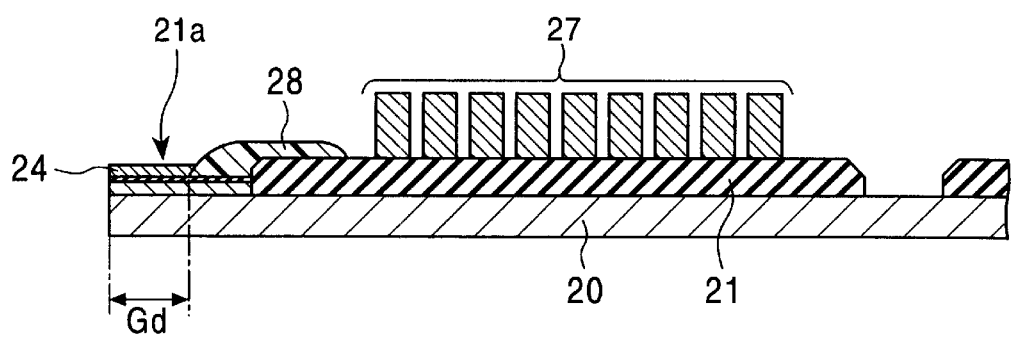
FIG. 6 is a drawing showing a step next to the step shown in FIG. 5.

In the present invention, as shown in FIG. 6, the top pole layer 24 is formed between the ABS and the Gd setting insulation layer 28 within the trench 21a formed in the insulation layer 21 so that the gap depth Gd is determined by the dimension from the ABS to the boundary between the top pole layer 24 and the Gd setting insulation layer 28.

In the present invention, as shown in FIG. 6, the coil layer 27 is patterned on a portion of the surface 21b of the insulation layer 21, which is located at the back of the Gd setting insulation layer 28 in the depth direction.

Since the surface 21b of the insulation layer 21 is planarized, resolution of a resist layer (not shown) used for forming the coil layer 27 can be improved. Therefore, the coil layer 27 can be precisely patterned with a narrow pitch on the insulation layer 21, and the entire size of the coil layer 27 can be decreased.

Figure 7:
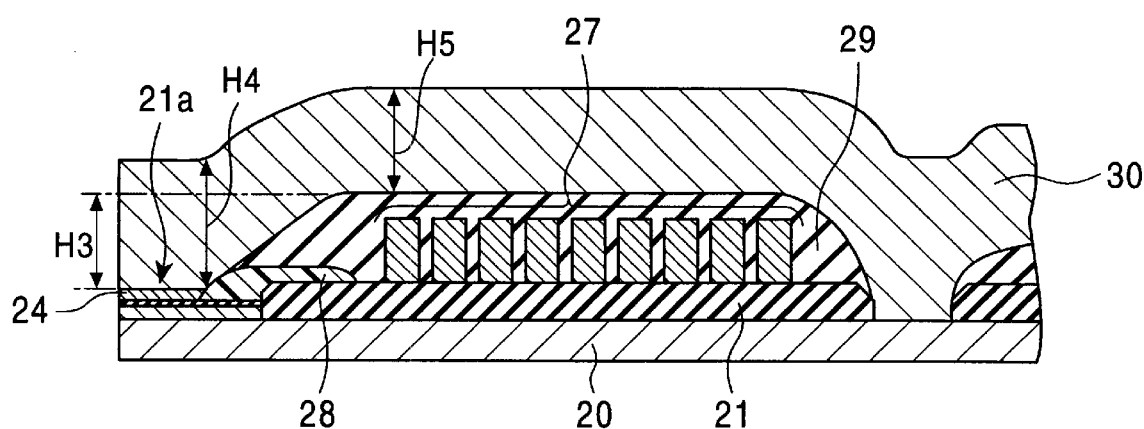
FIG. 7 is a drawing showing a step next to the step shown in FIG. 6.

Next, as shown in FIG. 7, the coil insulation layer 29 is formed on the coil layer 27 to cover the coil layer 27, and then a resist layer 30 is formed to extend from the top pole layer 24 formed in the trench 21a of the insulation layer 21 to the coil insulation layer 29.

In the present invention, as described above, the coil layer 27 is formed directly on the insulation layer 21, and the Gd setting insulation layer 28 is formed at the same level (on the insulation layer 21) as the coil layer 27.

Therefore, unlike the conventional example shown in FIG. 10, the height dimension H3 from the top of the top pole layer 24 to the top of the coil insulation layer 29 does not include the thickness of the Gd setting insulation layer 28, and can thus be decreased as compared with the conventional example.

Therefore, in comparison between the thickness dimension H4 of the resist layer 30 formed on the top pole layer 24 and the thickness dimension H5 of the resist layer 30 formed on the coil insulation layer 29, the thickness dimension H4 is not so larger than the thickness dimension H5.

Since the thickness dimension H4 of the resist layer 30 formed on the top pole layer 24 is not so large, as described above, the focal depth can be increased, and resolution in exposure and development can be improved, thereby permitting the formation of the upper core layer 26 in the predetermined pattern in the resist layer 30.

Figure 8:
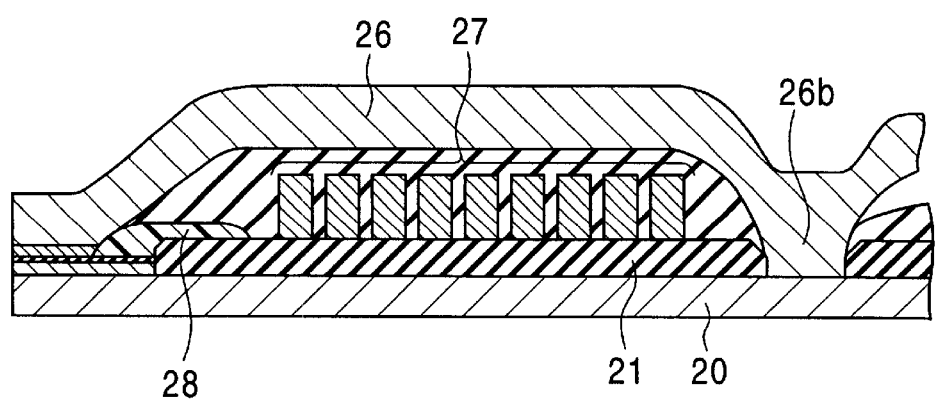
FIG. 8 is a drawing showing a step next to the step shown in FIG. 7.

Then, a magnetic material layer of permalloy or the like is plated in the pattern (not shown) of the upper core layer 26 formed in the resist layer 30, and the resist layer 30 is removed to complete the upper core layer 26, as shown in FIG. 8.

As shown in FIG. 8, the upper core layer 28 is formed =z to extend from the top pole layer 24 to the coil insulation layer 29, and the base end 26b is magnetically connected to the Lower core layer 20.

In the manufacturing method of the present invention, since the coil layer 27 is formed directly on the insulation layer 21, the height dimension H3 from the top of the top pole layer 24 (the position where the tip of the upper core layer 26 is formed) to the top of the coil insulation layer 29 can be decreased as compared with a conventional example, and the resist layer 30 used for forming the upper core layer 26 can be formed to have a thickness which is not so large on the top pole layer 24.

Therefore, the upper core layer 26 can be precisely patterned in the resist layer 30 formed to extend from the top pole layer 24 to the coil insulation layer 29, thereby permitting the formation of the upper core layer 26 having the predetermined shape.

In the present invention, also the coil layer 27 is formed directly on the insulation layer 21 to permit the precise patterning of the coil layer 27 with a narrow pitch.

Although, in the present invention, the bottom pole layer 22, the gap layer 22 and the top pole layer 24 are formed by plating in the trench 21a formed in the insulation layer 21, another film structure may be used.

For example, only the bottom pole layer 22 and the gap layer 23 may be formed by plating in the trench 21a without the top pole layer 24 formed, and the tip of the upper core layer 26 may be formed by plating on the gap layer 23 in the trench 21a.

As described in detail above, in the present invention, a coil layer is patterned directly on an insulation layer formed on a lower core layer to decrease the height dimension from the position where the tip of an upper core layer is formed to the top of a coil insulation layer formed on the coil layer as compared with a conventional example, thereby permitting the precise patterning of the upper core layer.

Also, in the present invention, the surface of the insulation layer is planarized, and the coil layer is patterned directly on the insulation layer. Therefore, even with a narrow pitch, the coil layer can be precisely patterned, and the length dimension from the tip to the base end of the upper core layer can be decreased, as compared with a conventional example.

Since the length dimension of the upper core layer can be decreased, as described above, the length of the magnetic path formed by the upper core layer and the lower core layer can be shortened to enable an attempt to decrease inductance.

In the manufacturing method of the present invention, the coil layer is patterned directly on the planarized insulation layer, thereby permitting the coil layer to be easily and securely formed with a narrow pitch.

Furthermore, the height dimension from the position where the tip of the upper core layer is formed to the top of the coil insulation layer formed on the coil layer can be decreased as compared with a conventional example, thereby permitting the upper core layer to be easily and precisely patterned.

What is claimed is:

1. A thin film magnetic head comprising a lower core layer made of a magnetic material, an upper core layer made of a magnetic material, and an insulation layer located between the lower and upper core layers and having a trench defining a track width Tw, all of which appear on a surface facing a recording medium, the upper and lower core layers being laminated with a gap layer provided therebetween and located in the trench;

wherein a coil layer is formed directly on the insulation layer to be located at a back of the trench formed in the insulation layer in a depth direction, to induce a recording magnetic field in each of the upper and lower core layers; and a Gd (gap depth) setting insulation layer is provided on the insulation layer to extend in the depth direction from a back portion of the trench to a portion of the insulation layer surface where the trench and the coil layer is not formed, and the upper core layer is formed on the Gd setting insulation layer from the surface facing the recording medium such that the gap depth is determined by the recording medium-facing side end of the Gd setting insulation layer.

2. A thin film magnetic head according to claim 1, wherein the upper core layer is formed to extend into the trench.

3. A method of manufacturing a thin film magnetic head comprising a lower core layer made of a magnetic material, an upper core layer made of a magnetic material and opposed to the lower core layer with a nonmagnetic gap layer provided therebetween on a surface facing a recording medium, and a coil layer to induce a recording magnetic field in each of the lower and upper core layers; the method comprising:

forming an insulation layer on the lower core layer and forming a trench in the insulation layer in a depth direction from the surface facing the recording medium, thereby defining a track width Tw;

forming a bottom pole layer magnetically connected to the lower core layer, the gap layer, and a top pole layer magnetically connected to the upper core layer in the trench by plating in turn from a bottom of the trench;

patterning the coil layer directly on the insulation layer so that the coil layer is located at a back of the trench formed in the insulation layer in the depth direction;

forming a coil insulation layer on the coil layer; and forming the upper core layer on the top pole layer and the coil insulation layer.

4. A method of manufacturing a thin film magnetic head according to claim 3 wherein a Gd (gap depth) setting insulation layer is formed to extend in the depth direction from the back portion of the trench to a portion of the insulation layer surface where the trench is not formed, and the coil layer is not formed, the top pole layer is formed in the trench between the surface facing the recording medium and the Gd setting insulation layer, and the upper core layer is formed on the top pole layer and the Gd setting insulation layer such that a gap depth is determined by a dimension from the surface facing the recording medium to a boundary between the top pole layer and the Gd setting insulation layer.

5. A thin film magnetic head comprising a lower core layer made of a magnetic material, an upper core layer made of a magnetic material, and an insulation layer located between the lower and upper core layers and having a trench defining a track width Tw, all of which appear on a surface facing a recording medium, the upper and lower core layers being laminated with a gap layer provided therebetween and located in the trench;

wherein a coil layer is formed directly on the insulation layer to be located at a back of the trench formed in the insulation layer in a depth direction, to induce a recording magnetic field in each of the upper and lower core layers;

a bottom pole layer magnetically connected to the lower core layer, a gap layer, and a top pole layer magnetically connected to the upper core layer are formed by plating in turn from a bottom in the trench of the insulation layer; and a Gd (gap depth) setting insulation layer is provided on the insulation layer to extend in the depth direction from a back portion of the top pole layer to a portion of the insulation layer surface where the trench is not formed, and the coil layer is not formed, and the upper core layer is formed on the top pole layer and the Gd setting insulation layer from the surface facing the recording medium such that a gap depth is determined by a dimension from the surface facing the recording medium to a boundary between the top pole layer and the Gd setting insulation layer.

* * * * *